(12) United States Patent
Carstensen

(10) Patent No.: US 7,721,657 B2
(45) Date of Patent: May 25, 2010

(54) PIVOTABLE TABLE

(75) Inventor: Sven Carstensen, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 155 days.

(21) Appl. No.: 11/725,558

(22) Filed: Mar. 20, 2007

(65) Prior Publication Data

US 2007/0227407 A1    Oct. 4, 2007

(30) Foreign Application Priority Data

Mar. 22, 2006    (EP)    ................... 06005897

(51) Int. Cl.
    *A47B 3/00*    (2006.01)
    *A47B 23/00*   (2006.01)
(52) U.S. Cl. .............. 108/40; 108/42; 108/44; 108/134; 312/317.3
(58) Field of Classification Search .......... 108/134, 108/42, 44, 40; 248/240, 240.1, 240.4; 312/322, 312/323, 310, 313, 314, 317.1, 317.3
    See application file for complete search history.

(56) References Cited

U.S. PATENT DOCUMENTS

| 1,498,319 | A | * | 6/1924 | Dexter | ............ | 108/40 |
| 1,699,496 | A | * | 1/1929 | Wasmuth | ............ | 108/40 |
| 1,790,468 | A | * | 1/1931 | Frank et al | ............ | 108/38 |
| 2,536,366 | A | * | 1/1951 | Harris et al. | ............ | 108/37 |
| 4,068,601 | A | * | 1/1978 | Marsh et al. | ............ | 108/134 |
| 4,829,910 | A | * | 5/1989 | Lirette | ............ | 108/80 |
| 2003/0047120 | A1 | | 3/2003 | Dettmers | | |
| 2003/0188672 | A1 | * | 10/2003 | Parent et al. | ............ | 108/134 |
| 2009/0078169 | A1 | * | 3/2009 | Osborne et al. | ............ | 108/40 |

FOREIGN PATENT DOCUMENTS

| FR | 2 802 070 | | 6/2001 | | |
| WO | 8802430 | * | 4/1988 | ............ | 108/134 |
| WO | 9111130 | * | 8/1991 | ............ | 108/134 |

OTHER PUBLICATIONS

European Search Report dated Sep. 21, 2006 issued in counterpart DE Application No. 06005897.

* cited by examiner

*Primary Examiner*—Hanh V Tran
(74) *Attorney, Agent, or Firm*—Morrison & Foerster LLP

(57) ABSTRACT

A pivotable table has a lower housing and a table top which can be moved from a storage position, in which the table top is arranged substantially perpendicularly in the lower housing, into a use position, in which the table top is arranged substantially horizontally above the lower housing and is carried by the lower housing. The table includes at least one carrying arm that has an end region which is connected pivotably to the table top and a remote end region which is connected to the lower housing via a carrying arm guide. The table also includes at least one supporting arm, the two end regions of which are connected in each case to the table top and to the carrying arm, at least one of these two connections being of displaceable configuration via at least one supporting arm guide.

14 Claims, 4 Drawing Sheets

PIVOTABLE TABLE

REFERENCE TO RELATED APPLICATION

This application claims priority from European Application No. 06 005 897.1, filed Mar. 22, 2006, the entire contents of which are incorporated herein by reference.

FIELD OF THE INVENTION

The present invention relates to a pivotable table, having a lower housing and a table top which can be moved from a storage position, in which the table top is arranged substantially perpendicularly in the lower housing, into a use position, in which the table top is arranged substantially horizontally above the lower housing and is carried by the latter.

BACKGROUND OF THE INVENTION

In means of transportation, in particular airplanes, storable tables are frequently provided for the passengers. In VIP airplanes and in the first class section of conventional commercial passenger airplanes, a table of this type is usually pulled out of what is known as a credenza, which is arranged next to the seats, and is folded into a use position, in which the table top is arranged partially over the seat surface of the seats.

It is problematical in tables of this type that a plurality of requirements have to be united which are difficult to combine with one another. The credenza is usually lower than the armrests of the seats. This means that the table top has to be arranged considerably above the upper edge of the credenza in the use position. A mechanism therefore has to be provided which holds said table top in this higher position. The table top has to be self-supporting, and all loads which act on the table top therefore have to be conducted into the credenza. This can be problematical, in particular, in a long lever arm for the active forces (for example, a passenger who stumbles along the aisle).

It is known to secure the table top of a table of this type pivotably on a carrying arm which protrudes out of the upper edge of the credenza in the use position and therefore produces the necessary spacing between the upper edge of the credenza and the table top. The lid of the credenza is configured as a type of catching hook, and that edge of the table top which points away from the passenger seat can be hooked into the lid in its open position, with the result that the tilting moment which acts on the table top is conducted into the credenza via this lid. This solution is disadvantageous, as a lid which is fastened to the credenza by means of a hinge is not particularly well suited for absorbing loads.

SUMMARY OF THE INVENTION

The invention is therefore based on the object of providing a table of the type which is mentioned in the introduction, is simple to handle and has satisfactory stability.

In a table according to the invention as generally disclosed herein, including a lower housing and a table top which can be moved from a storage position, in which the table top is arranged substantially perpendicularly in the lower housing, into a use position, in which the table top is arranged substantially horizontally above the lower housing and is carried by the lower housing, the invention achieves this object by the following features:

a) at least one carrying arm is provided, the end region of which is close to the table top is connected pivotably to the table top;

b) that end region of the at least one carrying arm which is remote from the table top is connected displaceably to the lower housing via a carrying arm guide;

c) in the use position, that end region of the at least one carrying arm which is remote from the table top is situated in a carrying arm holding position in the carrying arm guide;

d) at least one supporting arm is provided, the two end regions of which are connected in each case to the table top and to the at least one carrying arm, at least one of these two connections being of displaceable configuration via at least one supporting arm guide;

e) in the use position, the table top is carried by the at least one carrying arm and the at least one supporting arm, the supporting arm being situated in a supporting arm holding position.

First of all, some of the terms which are used in the context of the invention are to be explained.

The table according to the invention has a lower housing. This lower housing serves to receive the table top in the storage position. In the use position of the table top, said lower housing serves to absorb and conduct the forces which act on the table top. Said forces are preferably conducted away into the underlying surface exclusively via the lower housing. In the storage position, the table top is arranged substantially perpendicularly in the lower housing. Within the context of the invention, "substantially perpendicularly" includes inclination angles up to 20° with respect to the perpendicular.

In the use position, the table top is situated substantially horizontally above the lower housing. "Above" means that that the table top extends at a higher level than a horizontal surface through the upper edge of the lower housing. It does not mean that the table top is arranged completely or substantially perpendicularly above the lower housing; it can also be arranged completely or substantially laterally thereto. The tabletop is carried by the lower housing in the use position. There are therefore preferably no further devices, by means of which force is conducted away into the underlying surface (for example, no table legs).

The carrying arm which is provided according to the invention is connected pivotably to the table top in that end region of said carrying arm which is close to the table top. Within the context of the invention, "connected to the table top" includes carrying arms or the supporting arms which are still to be explained being connected to a separate device, such as a carrying frame, which in turn carries the actual table top. The ability to pivot serves to make it possible for the table top to pivot from the substantially perpendicular storage position into the substantially horizontal use position.

That end region of the at least one carrying arm which is remote from the table top is connected displaceably to the lower housing via a carrying arm guide. This carrying arm guide serves to make it possible for the substantially perpendicularly pivoted table top to be pulled out of the lower housing together with the carrying arm which is arranged pivotably on it, or to be pushed back into the storage position.

In the use position of the table top, that end region of the at least one carrying arm which is remote from the table top is situated in a carrying arm holding position in the carrying arm guide. This means that the carrying arm is fixed in this holding position in such a way that it cannot slide back in the carrying arm guide during conventional use of the table. For example, it can be locked and/or latched in the carrying arm holding position.

The carrying arm protrudes beyond the upper edge of the lower housing in the use position and therefore brings it about that the table top is arranged in a plane above this upper edge of the lower housing in the use position.

In the use position, the table top has to be fixed by at least one second holding element, in order that it can no longer pivot with respect to the carrying arm. According to the invention, there is then provision for this to take place by means of at least one supporting arm, the two end regions of which are connected in each case to the table top and to the at least one carrying arm, at least one of these two connections being of displaceable configuration via at least one supporting arm guide. For example, the supporting arm can be arranged pivotably on the carrying arm with its end which is remote from the table top; that end of the supporting arm which is close to the table top is arranged in a supporting arm guide on the table top. That end of the supporting arm which is close to the table top can be displaced in this supporting arm guide. In the storage position of the table top, the carrying arm and the supporting arm are arranged close to the table top substantially parallel to one another. If the table top is pulled out and the pivoting movement into the substantially horizontal use position is subsequently started, the supporting arm pivots out of the parallel position with respect to the carrying arm and its end which is close to the table top is displaced in the guide on the table top. In the horizontal use position, that end of the supporting arm which is close to the table top preferably comes into contact with a stop of the supporting arm guide and is in the supporting arm holding position.

According to the invention, the table top is held above the upper edge of the lower housing jointly by the carrying arm and the supporting arm in its use position. Here, the supporting arm is fastened to the carrying arm and the table top in such a way that, in the use position, the carrying arm, the supporting arm and a part section of the table top define a triangle. Those end regions of the carrying arm and the supporting arm on the table top side absorb the forces which act on the table top and conduct them away into the lower frame via the carrying arm. During pivoting of the table top into the substantially perpendicular position, the supporting arm pivots toward the carrying arm in the variant which is shown. That end of the supporting arm on the tabletop side is displaced in the guide in the direction of the carrying arm.

As an alternative, for example, that end of the supporting arm on the table top side can be attached pivotably to the table top; the end on the carrying arm side is arranged displaceably in a guide of the carrying arm. In this case, the supporting arm and the carrying arm also move to become substantially parallel to one another during pivoting of the table top into the substantially perpendicular position.

The supporting arm and the carrying arm have interacting kinematics which, by simple pivoting of the table top into the use position, define a triangle which comprises the supporting arm and the carrying arm and carries the tabletop.

In the storage position, the table top which is stored in the lower housing preferably has an inclination with respect to the perpendicular which preferably lies between 1 and 20°, further lies preferably in the range from 2 to 5°, and particularly preferably lies in the region of approximately 3°. This inclination is preferably configured such that it is oriented in the direction of the passenger seat. It makes it easier for the passenger who is seated next to the lower housing to pull the table top out and permits the installation of the table close to the outer wall of an airplane, even if the external skin is curved inward toward the top. An inclination of this type is of particular significance for the handling capability of the table if the table is installed, for example, on the upper deck of a Boeing 747, as the airplane external skin is inclined inward toward the top in a particularly pronounced manner there.

The table top is particularly preferably arranged on a carrying frame, for example is adhesively bonded and/or screwed to a carrying frame which is preferably made from metal. In this preferred embodiment, the carrying frame has the required elements for connection to the carrying arm and the supporting arm, for example a pivoting connection to the carrying arm and a supporting arm guide for displaceably receiving that end region of the supporting arm on the table top side.

The supporting arm guide preferably has a stop, against which the supporting arm bears in the supporting arm holding position (here, the table top is situated in the use position). This stop can be, for example, an end stop in a guide rail, in which that end of the supporting arm on the table top side runs.

The carrying arm can preferably be locked and/or latched in the carrying arm holding position. This brings about reliable holding of the table in the use position. The pivotable connection between the table top and the at least one carrying arm can have at least one angular stop. This annular stop can limit the possible pivoting angle of the table top, with the result that the latter cannot be pivoted beyond the substantially perpendicular position or below the substantially horizontal position. The carrying arm guide in the lower housing preferably has a vertical stop, with the result that the carrying arm cannot be pulled out beyond the upper carrying arm holding position.

There is frequently a desire for a table, the usable width of which is greater than the height of the lower housing. In this case, a folding table is preferably provided, in which the table top is formed from two or more part tops which can be moved, in particular can be pivoted, between an arrangement, in which they lie on top of one another, and an arrangement, in which they lie next to one another. In the storage position, the part tops can lie in the lower housing in a state, in which they are folded one above another. During the movement into the use position, first of all the part tops which still lie one above another are pulled out and pivoted into the horizontal position, and subsequently the two part tops are moved, in particular pivoted, into their arrangement, in which they lie next to one another. In this embodiment, a carrying frame is preferably arranged only under one part stop. In order to increase the stability of the table overall, there is preferably provision for the carrying frame to have a supporting grip which can be pulled out, is pushed under the second part top in the pulled out position and supports the latter.

In the use position, the difference in height between the upper edge of the table top and the upper edge of the lower housing preferably lies between 50 and 300 mm, and further lies preferably between 100 and 200 mm.

BRIEF DESCRIPTION OF THE DRAWINGS

In the following text, one exemplary embodiment of the invention will be explained using the drawings, in which.

DETAILED DESCRIPTION OF THE INVENTION

Figure 1:
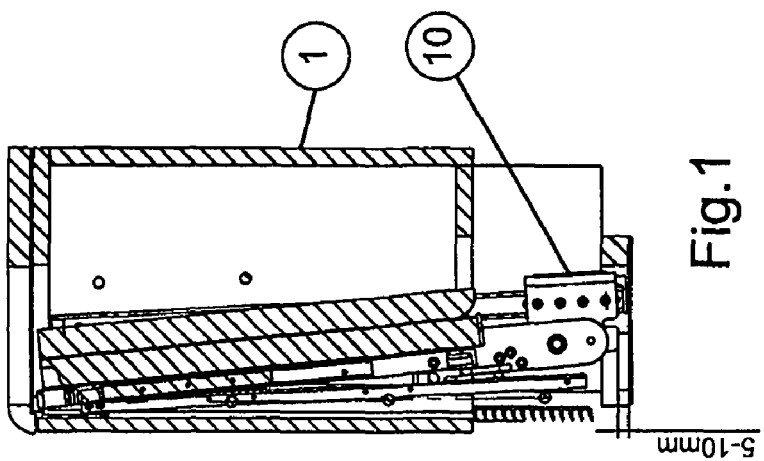
FIG. 1 diagrammatically shows a cross section through a table according to the invention, in the storage state.

A table which has two part table tops 2, 3 which can be folded against one another is arranged in a lower housing (credenza) which is denoted overall by 1. In the storage position which is shown in FIG. 1, these tabletops 2, 3 are situated folded on top of one another in the interior of the lower housing 1, at an angle of approximately 3° with respect to the perpendicular.

Figure 2:
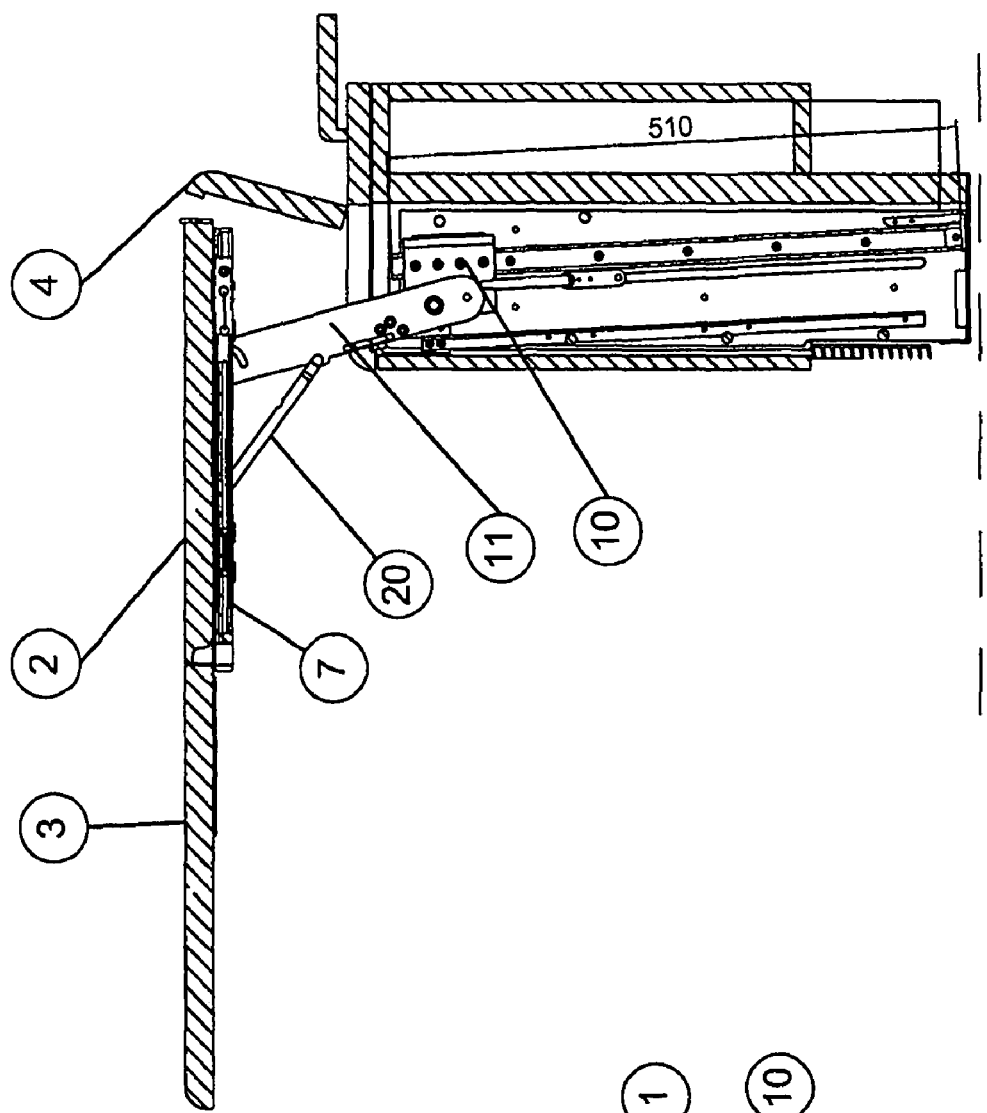
FIG. 2 diagrammatically shows a cross section in the use state.

FIG. 2 shows the table in the use position. The upper side of the credenza is closed with a lid 4. After the lid has been folded open, the table tops 2, 3 can be pulled out of the credenza. In the use position, the table is held by carrying arms 11 and supporting arms 20 which act on a carrying frame 7, to which in turn the table top 2 is connected.

Figure 3:
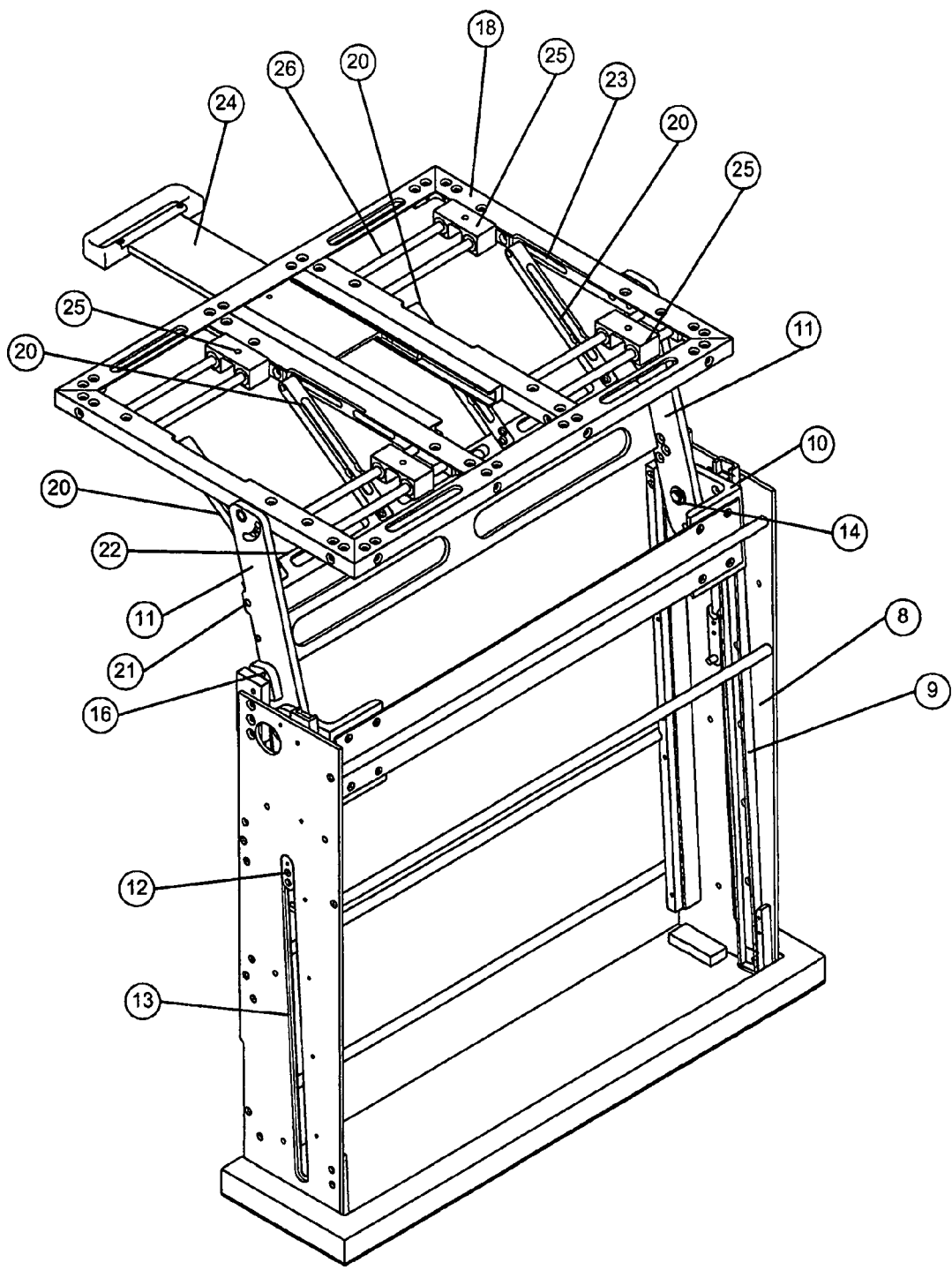
FIG. 3 shows the carrying construction for the table which is arranged in the lower housing, with the carrying frame for the table top.
Figure 6:
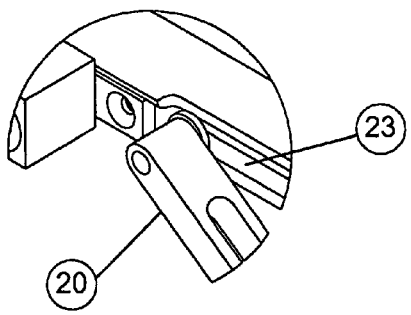
FIG. 6 shows the stop of a supporting arm in the use position of the table top, in a detail from FIG. 3.

FIG. 3 shows the carrying frame which is arranged in the credenza, and the carrying mechanics of the table tops including the carrying frame. Guide rails 9 are arranged in the carrying frame which is denoted overall by 8, in which guide rails 9 the sliding frame 10 which in turn carries the carrying arms 11 is mounted displaceably. The guide of the sliding frame 10 in the guide rails 9 is mounted in a ball bearing, in order to make pushing in and out easier. The upper stop of the sliding frame 10 and therefore of the carrying arms 11 is defined by guide pieces 12 of the sliding frame 10 which are guided in guides 13 of the carrying frame 8. In the position which is shown in FIG. 3, the sliding frame 10 and the carrying arms 11 are situated in the upper end position, what is known as the carrying arm holding position.

Pulling of the table construction out of the lower frame is assisted by springs (not shown in the drawing) which assist pulling out counter to gravity.

Figure 5:
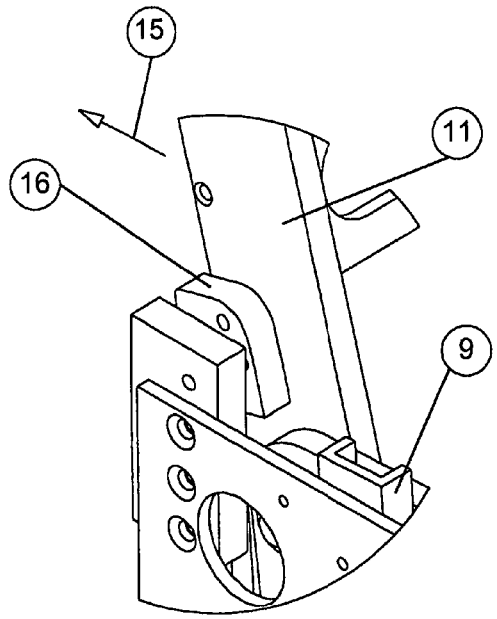
FIG. 5 shows the locking of the carrying arm in the carrying arm holding position, in a detail from FIG. 3.
Figure 4:
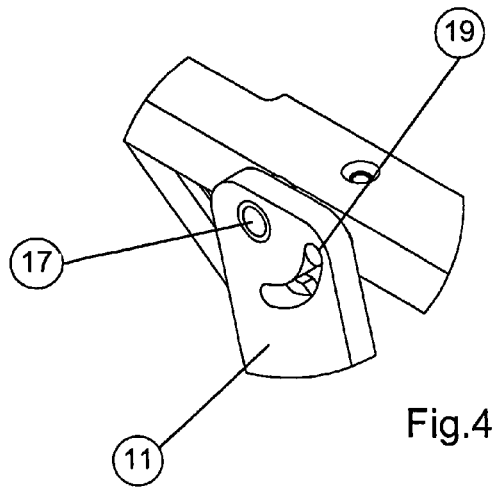
FIG. 4 shows the angular stop for the carrying arm, in a detail from FIG. 3.

The carrying arms 11 are mounted on the sliding frame 10 at 14 such that they can pivot about a small angle. After the table has been pulled out of the credenza and the upper end position (carrying arm holding position) of the sliding frame 10 and the carrying arms 11 has been reached, the carrying arms 11 can be tilted slightly in the direction of the arrow 15 (FIG. 5), with the result that the carrying arms 11 and the sliding frame 10 are fixed in the carrying arm holding position by the locking pieces 16. These locking pieces 16 hook over an upper edge of the carrying frame 8 and prevent the sliding frame 10 and the carrying arms 11, together with the table, from sliding down in the guide rail 9 again as a result of the effect of gravity. The locking pieces 16 preferably have undercuts, with the result that they can be unlocked only by slight raising of the carrying arms 11.

The carrying arms 11 are connected pivotably at 17 to a carrying frame 18 for the table top. Angle limiters which are shown at 19 limit the pivoting angle of the carrying frame 18 relative to the carrying arms 11, with the result that the carrying frame 18 cannot be pivoted further downward beyond the horizontal use position and, furthermore, the pivoting angle is limited during folding up of the carrying frame 18 when the carrying frame 18 is substantially aligned with the carrying arms 11.

A total of four supporting arms 20 are arranged pivotably on the carrying arms 11. The pivoting connection to the carrying arms 11 takes place at 21 via a base bar 22 which is common to the four supporting arms 20. Those end regions of the supporting arms 20 on the table top side are mounted displaceably in guides 23 in the carrying frame 18. These guides 23 are dimensioned in such a way that the supporting arms in each case reach an end stop, firstly in the substantially horizontal use position and secondly in the folded up position (substantially parallel to the carrying arms 11).

Figure 7:
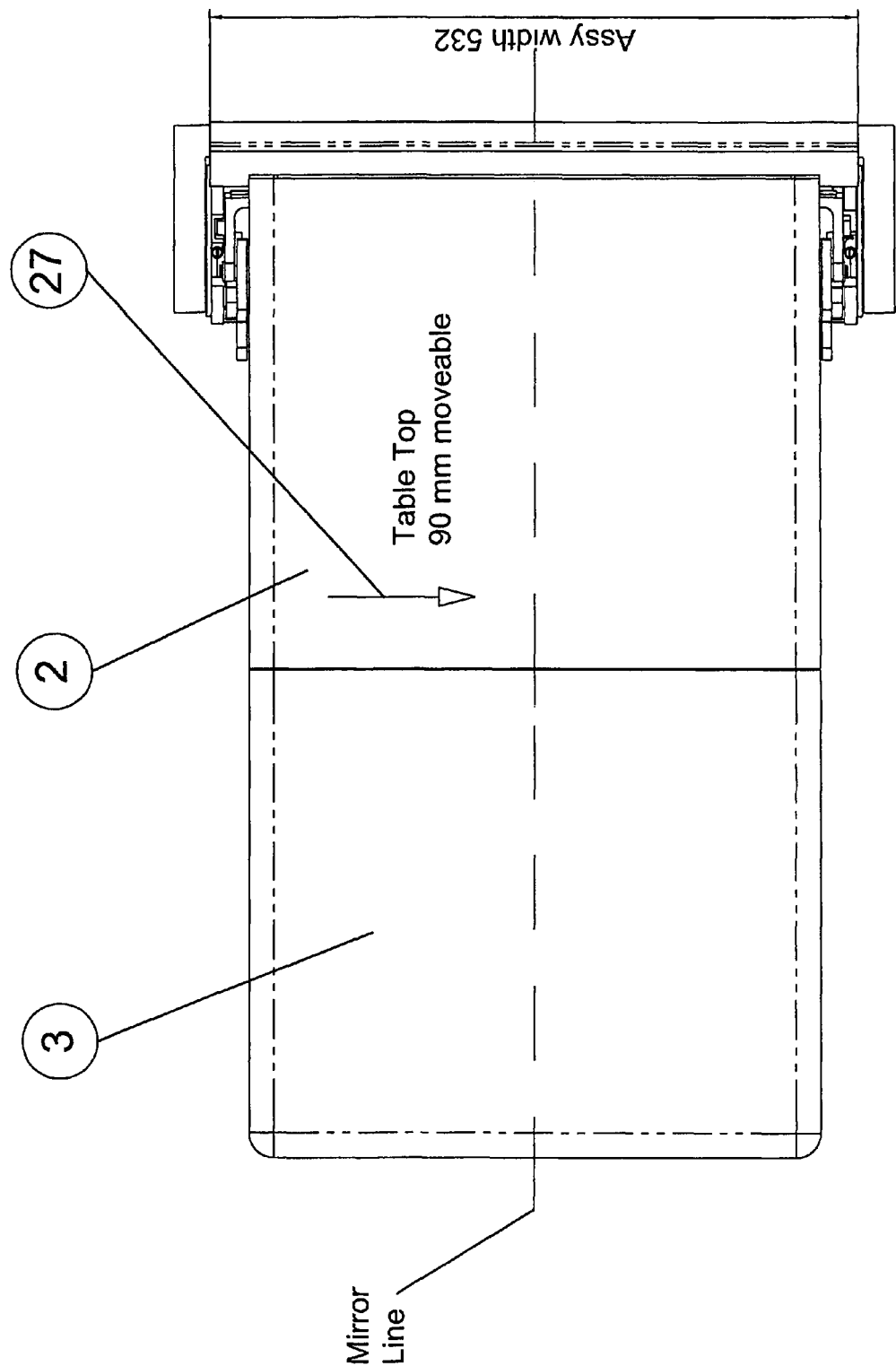
FIG. 7 diagrammatically shows a plan view from above of the table according to the invention in the use position.

The carrying frame 18 has a supporting grip 24 which can be pulled out. In the pulled out state, this supporting grip 24 serves to support the second table top half 3 in the use position. The table top half 2 which is connected to the carrying frame 18 is connected, in particular screwed, to four sliding elements 25. These sliding elements 25 are arranged displaceably on rods 26. In this way, the table top can be pushed forward and backward relative to the carrying frame 18 in the use position, as the arrow 27 in FIG. 7 indicates.

The table is pulled out of the storage position shown in FIG. 1 into the use position shown in FIG. 2 as follows.

First of all, the lid 4 of the credenza is opened. The entire table can preferably be gripped on the supporting grip 24 and pulled out upward in the direction of the guide rail 9. When the sliding frame 10 with the carrying arms 11 has reached the upper end stop, the carrying arms 11 tilt slightly in the direction of the arrow 15 (FIG. 5), with the result that the locking pieces 16 block the carrying arms 11 in the carrying arm holding position. Subsequently, the carrying frame 18 is folded down with the table tops 2, 3 which are arranged on it into the substantially horizontal position which is shown in FIG. 3. In this horizontal use position, those end regions of the supporting arms 20 on the table top side come into contact with the end stop in the guide 23, with the result that further tilting down of the carrying frame 18 with the table tops 2, 3 which are arranged on it is prevented. Subsequently, the supporting grip 24 can be pulled out and the table top 3 can be folded over into the position which is shown in FIG. 2. The table is now ready for use. In the use position, the table tops 2, 3 can be pushed to and fro in the direction of the arrow 27 in FIG. 7. Here, the sliding elements 25 slide on the rods 26.

The invention claimed is:

1. A table, comprising:
    a lower housing;
    a table top which can be moved from a storage position, in which the table top is arranged substantially vertically in the lower housing, into a use position, in which the table top is arranged substantially horizontally above the lower housing and is carried by the lower housing;
    at least one carrying arm having one end region close to the table top that is connected pivotably to the table top and another end region remote from the table top connected displaceably to the lower housing via a carrying arm guide; and
    supporting arms having end regions of which are respectively connected to the table top and to the at least one carrying arm, at least one of these connections being of a displaceable configuration via at least one supporting arm guide; and
    wherein, in the use position,
        the another end region of the at least one carrying arm is situated in a carrying arm holding position in the carrying arm guide, and
        the table top is carried by the at least one carrying arm and supporting arms, the supporting arms being situated in a supporting arm holding position, the supporting arms connecting to the at least one carrying arm at a location above the lower housing.

2. The table as claimed in claim 1, wherein the table top has an inclination angle with respect to a vertical plane in the storage position lying between 1 degree and 20 degrees.

3. The table as claimed in claim 1, wherein the table top has an inclination angle with respect to a vertical plane in the storage position in the range from 2 degrees to 5 degrees.

4. The table as claimed in claim 1, 2 or 3, wherein the table top comprises a carrying frame via which the table top is connected to the at least one carrying arm and supporting arms.

5. The table as claimed in claim 1, 2 or 3, wherein the at least one supporting arm guide is arranged in or on the table top and a pivotable connection is formed between the supporting arms and the at least one carrying arm.

6. The table as claimed in claim 1, 2 or 3, wherein the at least one supporting arm guide which belongs to a displaceable connection is arranged in the at least one carrying arm and a pivotable connection is formed between the supporting arms and the table top.

7. The table as claimed in claim 1, 2 or 3, wherein the supporting arm guide has a stop against which one supporting arm bears in the supporting arm holding position.

8. The table as claimed in claim 1, 2 or 3, wherein the at least one carrying arm can be locked or latched in the carrying arm holding position.

9. The table as claimed in claim 1, 2 or 3, wherein the pivotable connection between the table top and the at least one carrying arm has at least one angular stop.

10. The table as claimed in claim 1, 2 or 3, wherein the carrying arm guide has a vertical stop.

11. The table as claimed in claim 1, 2 or 3, wherein the table top comprises at least two part tops which can be moved between an arrangement, in which they lie on top of one another, and an arrangement, in which they lie next to one another.

12. The table as claimed in claim 4, wherein the carrying frame has at least one supporting grip which can be pulled out in order to support the table top.

13. The table as claimed in claim 1, 2 or 3, wherein, in the use position, a difference in height between the upper edge of the table top and the upper edge of the lower housing lies between 50 mm and 300 mm.

14. The table as claimed in claim 6, wherein, in the use position, a difference in height between the upper edge of the table top and the upper edge of the lower housing lies between 100 mm and 200 mm.

* * * * *